United States Patent [19]

LeVee

[11] Patent Number: 4,685,695
[45] Date of Patent: Aug. 11, 1987

[54] WATERTIGHT, SECURED TRUCK ENCLOSURE

[76] Inventor: Robert C. LeVee, 12719 NE. 7th Pl., Vancouver, Wash. 98664

[21] Appl. No.: 809,020

[22] Filed: Dec. 16, 1985

[51] Int. Cl.[4] .............................................. B62D 53/06
[52] U.S. Cl. .............................. 280/423 B; 296/24 R; 296/37.6
[58] Field of Search .................. 280/769, 770, 423 R, 280/423 B, 433, 425 A; 224/315, 42.42; 296/24 R, 37.6, 100

[56] References Cited

U.S. PATENT DOCUMENTS

| | | | |
|---|---|---|---|
| 1,838,344 | 12/1931 | Wilson | 296/37.6 |
| 3,245,713 | 4/1966 | Ogilvie | 296/24 R |
| 3,698,740 | 10/1972 | Chisholm et al. . | |
| 3,774,149 | 11/1973 | Bennett . | |
| 3,901,536 | 8/1975 | Black . | |
| 3,918,744 | 11/1975 | Gay . | |
| 3,936,077 | 2/1976 | Bliek | 280/423 R |
| 4,103,956 | 8/1978 | Faulstich | 296/24 R |
| 4,143,885 | 3/1979 | Mahosky . | |
| 4,168,847 | 9/1979 | Westphal . | |
| 4,216,990 | 8/1980 | Musgrove et al. . | |
| 4,433,853 | 2/1984 | Swaim . | |
| 4,542,911 | 9/1985 | Mulligan | 280/423 R |

Primary Examiner—John J. Love
Assistant Examiner—Charles R. Watts
Attorney, Agent, or Firm—Kolisch, Hartwell & Dickinson

[57] ABSTRACT

The secured enclosure of the instant invention includes a multi-compartmental enclosure, each compartment having a watertight door. The enclosure includes a powered vent system to provide circulation of air through the enclosure and a hitch receiving well formed in the enclosure for receiving a hitch for attaching a pulled vehicle to the pickup truck frame. The fifth wheel hitch of the invention includes an engagement mechanism for engaging a pulling vehicle, a mount for the engagement mechanism, which is shiftable between an extended and retracted position, and an obstruction sensor which is operable to detect an impending impact between the pulling vehicle and the towed vehicle during the hitching process. A warning device means are operable with the sensor to alert the operator of the impending impact.

8 Claims, 8 Drawing Figures

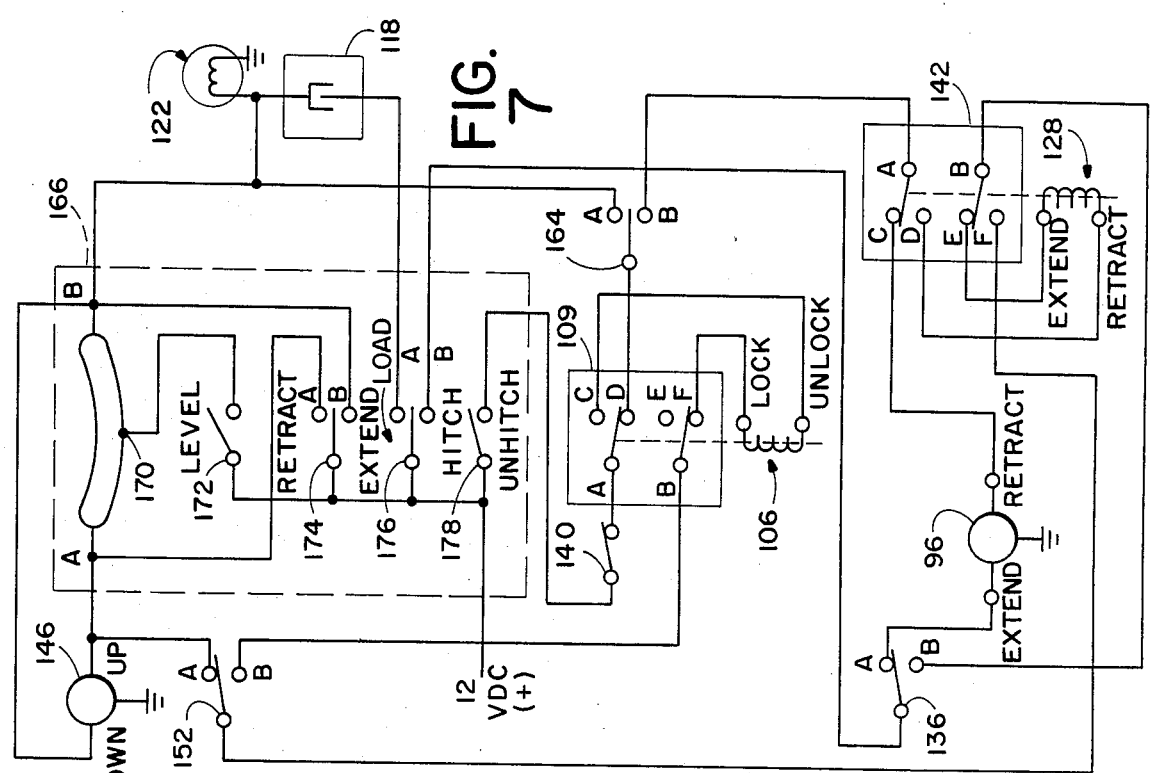

WATERTIGHT, SECURED TRUCK ENCLOSURE

BACKGROUND AND SUMMARY OF THE INVENTION

The instant invention relates to recreational vehicles and specifically, to a towing vehicle having a secured storage enclosure to replace the conventional bed on a pickup truck and a specialized fifth wheel trailer hitch which is used on a fifth wheel trailer towed by the pickup truck.

Fifth wheel trailers have become a popular form of recreational vehicle in that they provide additional living space by extending a portion of the trailer over the rear end of the pulling vehicle (pickup truck), thereby providing the additional space without increasing the overall length of the combined pulling vehicle/recreational vehicle combination. The disadvantage of conventional fifth wheel trailers is that the portion of the hitch which is located on the pickup truck generally requires the placement of a heavy (approximately 70-lb.) bar between the wheel wells of a conventional pickup bed, with the resultant loss of carrying capacity by the pickup truck.

Although a structure known as a utility bed has been used to provide some additional storage, provision of a utility bed on the pulling vehicle makes access to the central portion of the bed very difficult. Additionally, provision of the utility bed renders the already difficult task of connecting and disconnecting the trailer from the pulling vehicle even more difficult.

An object of the instant invention is to provide a secured storage enclosure for a pickup truck and to provide a fifth wheel hitch usable therewith.

Another object of the instant invention is to provide a fifth wheel hitch which is retractable, allowing passage of the hitch over a built-up, enclosed portion of a storage compartment.

Another object of the instant invention is to provide a fifth wheel hitch mechanism which greatly simplifies the hitching and unhitching operation.

Still another object of the instant invention is to provide a mechanism which will automatically level a recreational vehicle.

The secured enclosure of the instant invention includes a multi-compartmental enclosure, each compartment having a watertight door. The enclosure includes a powered vent system to provide circulation of air through the enclosure and a hitch receiving well formed in the enclosure for receiving a hitch for attaching a pulled vehicle to the pickup truck frame. The fifth wheel hitch of the invention includes engagement means for engaging a pulling vehicle, a mount for the engagement means, which is shiftable between an extended and retracted position, and an obstruction sensor which is operable to detect an impending impact between the pulling vehicle and the towed vehicle during the hitching process. Warning means are operable with the sensor to alert the operator of the impending impact.

These and other objects and advantages of the instant invention will become more fully apparent as the description which follows is read in conjunction with the drawings.

DESCRIPTION OF THE DRAWINGS

FIG. 2 is an enlarged partial cross section of the enclosure, taken generally along the line 2—2 in FIG. 1.

FIG. 3 is an end view of a fastener of the invention, taken generally along the line 3—3 of FIG. 2.

FIG. 5 is a partial cross section of a rear portion of the enclosure, taken generally along the line 5—5 of FIG. 4.

FIG. 7 is a block diagram of an electronic circuit of the invention.

DETAILED DESCRIPTION OF A PREFERRED EMBODIMENT

Figures 1, 6:
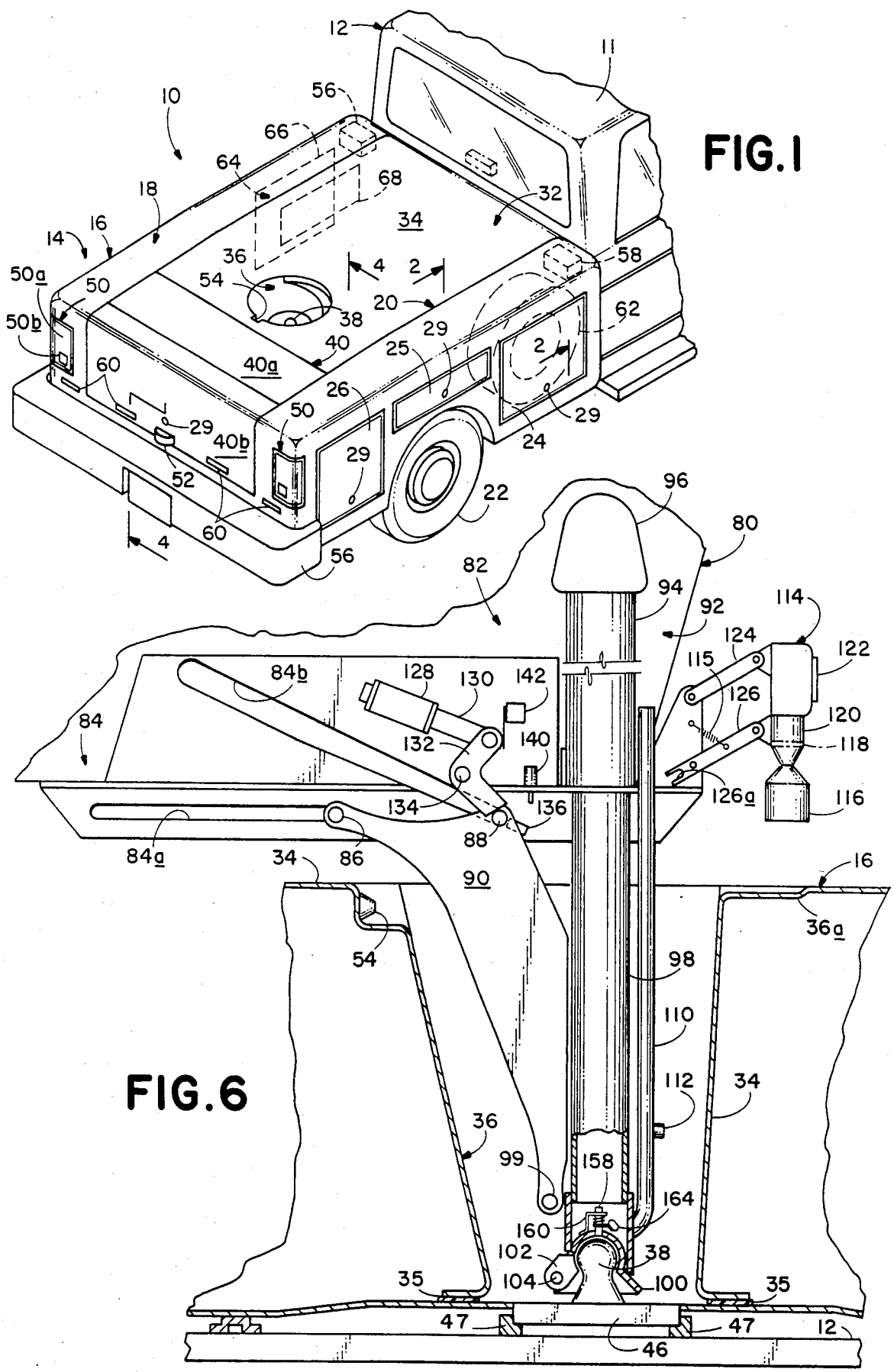
FIG. 1 is a partial perspective view of a pickup truck equipped with the secured enclosure of the invention.
FIG. 6. is an enlarged sectional side view of the hitch of FIG. 4 in an extended condition, with portions broken away to show detail.

Turning initially to FIGS. 1, and 2, a pulling vehicle is shown, fragmentarily, at 10. Vehicle 10, in the preferred embodiment, includes a conventional pickup truck cab 11 and frame 12 and a specially constructed secured enclosure 14. Enclosure 14 includes a multi-compartmental structure 16, which replaces the conventional open pickup bed. Structure 16 includes a pair of side storage areas 18 and 20 extending along either side of the pickup frame and over the rear wheels 22.

Storage areas 18 and 20 are substantially mirror images of one another. The storage areas include, and using storage area 20 as an example, multiple compartments, such as that shown generally at 21 in FIG. 2. Each compartment is covered by a door, or closure means, such as that indicated at 24, 25 and 26 in FIG. 1.

Each compartment has a gasket 27' about the periphery of the compartment opening. The gasket cooperates with the door to form a watertight seal. The doors are attached to the storage area by hinges 28 (two per door in the preferred embodiment). Hinge 28 includes a fixed segment 28a which is secured to the wall of the storage area, a hinge pin 28b, and a swinging segment 28c which is attached to the door. Segment 28c includes a first arcuate portion 28c' and a second arcuate portion 28c" which allows complete swinging of the door away from the opening of the compartment, as is indicated by the dashed lines in FIG. 2, and is further operative, with the door in a closed position or condition, to draw the door tightly against gasket 27 to form the watertight seal.

The doors are provided with locks 29 to both fasten the door in a closed position and to discourage unauthorized access. A bed 30 extends rearward from cab 11 and between side storage areas 18 and 20. Bed 30 is secured to frame 12 and replaces the normal bed found on pickup truck type vehicles. Bed 30 may be integrally formed with side storage areas 18 and 20, or may be formed as a separate element. Enclosure 14, in the preferred embodiment, is formed of fiberglass. The unit may also be formed of ABS type plastic, or from sheet metal. Bed 30 may be integrally formed with side storage areas 18 and 20, or formed as a discrete element and sealed to the side areas. In either situation, a watertight connection is provided across the frame of the pickup truck.

A center section 32 extends between side storage areas 18 and 20 and covers, in a watertight condition, bed 30. Section 32 includes a forward portion 34 which extends rearward from the truck cab and includes therein a hitch receiving well 36. In the preferred embodiment, well 36 has a substantially frusto-conical form. A hitch ball 38 is mounted on the truck frame at the base of well 36.

Referring now to FIGS. 2 and 3, portion 34 has a generally flat expanse 34a which extends between side areas 18 and 20, and a downwardly projecting flange 34b which is constructed to abut the exterior of inner walls 18a and 20a. Flange 34b has plural slots 34c formed therein. A peripheral flange 34d extends from expanse 34a beyond flange 34b and is sealed to areas 18 and 20 and to an upwardly extending portion 30a of bed 30 by a gasket 35.

Portion 34 is secured to side storage areas 18 and 20 by means of blind fasteners 37. Fasteners 37 include, in the preferred embodiment, a round head 37a which has a shaft 37b extending therefrom. Shaft 37b has a portion 37c extending from the end thereof and located on shaft 37b in a nonconcentric manner. A pin 37d extends, at right angles, through the end of reduced diameter portion or cam means, 37c. A spring 37e urges the fastener towards the interior of the compartments in storage areas 18 and 20.

Fasteners 37 are mounted on the inner wall, such as wall 20a of the storage compartments, and extend through a bore 20b formed therein. Referring now to FIG. 3, slot 34c is operable to receive pin 37d when the fastener is in the position as shown in phantom lines. Rotation of fastener 37 clockwise, as shown by the arrow, results in portion 37c forcing flange 34b downwards as portion 37c acts on slot 34c, which in turn draws the peripheral flange 34d against gasket 35, forming a weathertight seal.

Center section 32 also includes a rear portion 40 which completes the enclosure at the rear of the truck. Portion 40 includes a top cover section 40a and a rear door section 40b. Rear door 40b is secured to section 40a by hinges, such as hinge 28. Section 40a is secured to portion 34 by hinges, such as hinge 28, which has a removable pin. The entire rear portion, or folding door assembly, 40 may be removed, by removing the hinge pins, leaving an open section at the rear of the enclosure.

Figure 4:
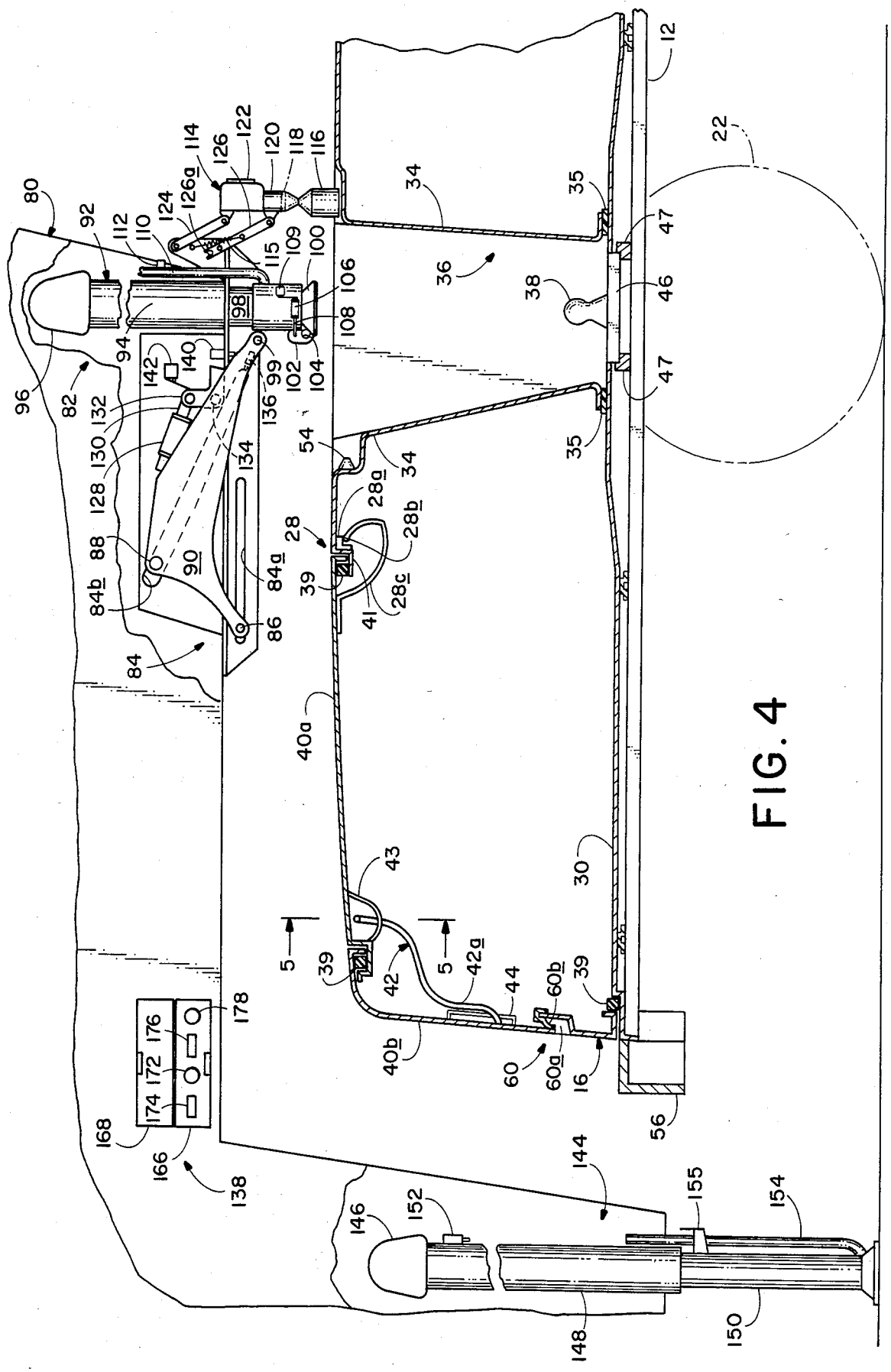
FIG. 4 is a partial cross section of the enclosure taken generally along the line 4—4 of FIG. 1, and a hitch of the invention.

Referring now to FIGS. 4 and 5, cover 40a joins with a lip 41 which is formed at the rear margin of forward portion 34. A gasket 39 is interposed between cover 40a and portion 34 to form a watertight seal. A lip and gasket are also located at the rear margin of portion 40a and cooperate with a flanged margin of door 40b to form a watertight seal. A spring fastener 42 is pivotably received in a mount 43 which is located on the underside of cover 40a adjacent its rear margin. An end of fastener 42 is slidably secured to door 40b by a retainer 44.

A transverse section 42b of fastener 42 extends from mount 43, which is located substantially at the center line of the vehicle, through a flange adjacent either side the margin of cover 40a and terminates in an offset tip 42c which extends through a bore in side wall 20a. Offset 42c is operable, similarly to offset portion 37c, such that when door 40b is closed, portion 42c is rotated to draw cover 40a downwards against gasket 39 and lip 41 and against gasket 35 on storage areas 18 and 20, thereby forming a watertight seal. As door 40b is raised, the arrangement of slots 43a in mount 43 is such that offset tip 42c is withdrawn from the bore in the storage areas. This allows folding of rear portion 40 over forward portion 34 and easy access to the center compartment.

Referring again to FIG. 1, enclosure 14 is provided with integral taillights 50 including the normal brake and taillight 50a and a backup light 50b. Another backup light 52 is provided on rear door 40b and a third backup light, or towed vehicle alignment means, 54 is provided at upper rear margin of well 36. Backup lights 52 and 54 are operable with conventional backup light 50b and provide illumination for coupling and uncoupling vehicle 10 and a towed vehicle during low light or dark conditions.

A bumper 56 is mounted to the frame of pickup 12 to protect the rear of the vehicle.

Powered vent means are provided to circulate air through structure 16 to prevent condensation of moisture therein. In the preferred embodiment, powered vent means includes blowers 56, 58, located on the forward ends of storage areas 18, 20, respectively. The various compartments inside the structure are interconnected so that air may circulate freely therebetween. Vents, such as vent 60, (FIGS. 1 and 4) are located at the rear of areas 18 and 20 and also in door 40b. The vent includes a louvered slot 60a formed in the wall of the component and a flexible strip 60b which allows air to exit the enclosure while preventing the entry of water and dust. The vents are located slightly above the level of bed 30.

The compartments inside structure 16 may be configured for specific uses, such as is compartment 21, which is configured to carry a spare tire 62. Other compartments, such as those associated with doors 26 and 28 are provided and may contain any type of item which is receivable therein. A compartment 64, associated with a door 66 on the left side of the structure, has a removable panel 68 which allows access to the center compartment under forward portion 34 from the left side of the vehicle. This feature enables the placement and removal of long objects, such as skis, golf bags, etc., in the structure without the removal of portion 34.

Referring now to FIG. 4, ball 38, in the preferred embodiment, is mounted on a plate 46 which is received in a mounting 47. Mounting 47 is secured to frame 12 of vehicle 10. Plate 46 is constructed such that it may be removed from mounting 47, and inverted therein, providing bed 30 with a substantially flat surface, as in a conventional pickup truck. If desired, center section 32 may be completely removed, by removing rear portion 40 and forward portion 34.

Figure 1A:
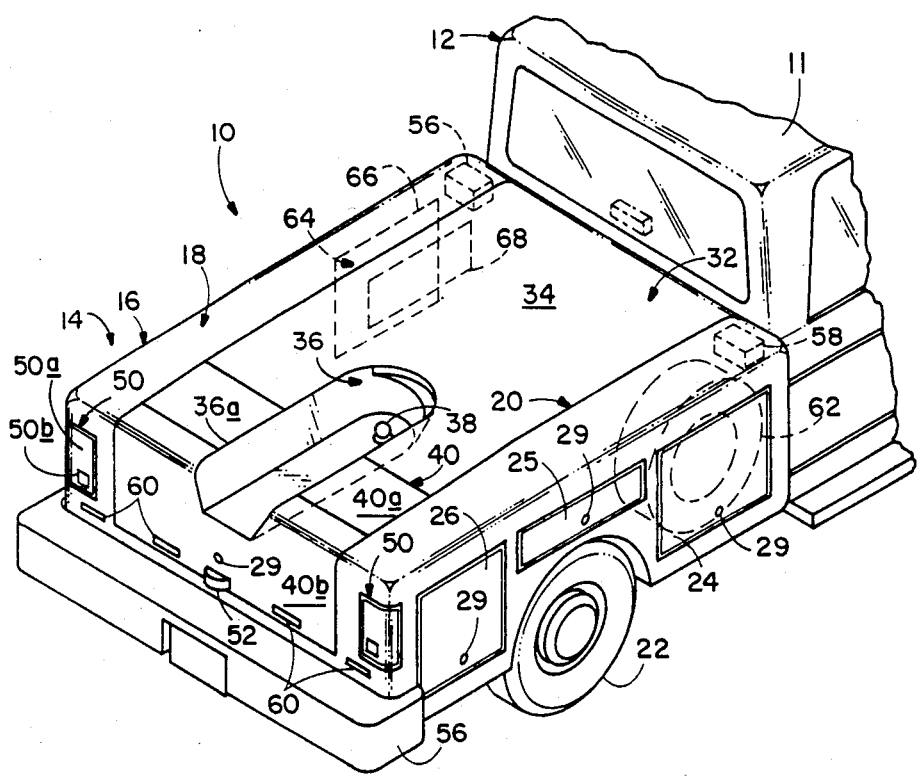
FIG. 1A is a partial perspective view of a pickup truck equipped with a modified version of the secured enclosure of the invention.

The secured enclosure thus far described is intended for use with a retractable hitch, to be described later herein. A modified form of the secured compartment, shown in FIG. 1A, may be used with a conventional fifth wheel hitch provided that well 36 is extended aft by menas of a truncated V-shaped groove 36a.

Turning again to FIG. 4, a portion of enclosure 16 is shown in cross section with a trailer 80 (partially shown) positioned in what is referred to herein as a ready-to-hitch position. Trailer, or towed vehicle, 80 is of the fifth wheel type and includes a fifth wheel hitch 82 constructed according to the invention. Hitch 82 includes a frame member 84 which is attached to the frame of trailer 80 on either side of the trailer centerline. It should be understood that only one frame member is shown for the purposes of simplicity, as is the case with many of the components to be described herein. Frame member 84 has a slot 84a formed therein which receives a traveling arm bearing 86 for movement therealong. A second slot 84b extends through the upper portion of frame member 84 and receives a second traveling arm bearing 88 therein. Bearings 86, 88 are mounted on a traveling arm 90.

A hitch retracting mechanism 92 is mounted on the forward end of frame member 84. Mechanism 92 includes a housing 94, a powered jack screw 96 and an extensible/retractable portion 98.

Portion 98, also referred to herein as engagement means mount, is shiftable between a retracted position, shown in FIG. 4, and an extended position, shown in FIG. 6. Traveling arm 90 is attached to portion 98 by a pivot pin 99 and is operable to stabilize portion 98 and transfer pulling forces exerted by vehicle 10 to trailer 80.

Portion 98 has a hitch ball receiving socket 100 mounted at its base. Socket 100 is operable to receive ball 38 therein, thereby effecting coupling between vehicle 10 and trailer, or pulled vehicle 80.

Socket 100 has a dog 102 pivotably mounted on a pivot shaft 104, which is secured to extensible portion 98, and is operable to lock ball 38 in socket 100. Such locking is accomplished by activation of a solenoid 106 which has an arm 108 operably connected to dog 102.

A conduit 110 is secured to extensible portion 98 for movement therewith. Conduit 110 is used to contain electrical wiring for the electrical components mounted on extensible portion 98. Additionally, conduit 110 has a pin 112 mounted thereon which is operable, as extensible portion 98 moves between a retracted and extended position, to shift an obstacle sensor 114 between an operating position and a rest position, respectively. An over-center spring 115 maintains sensor 114 in either position once it has been shifted.

Sensor 114 includes a deflectable portion 116 which deflects if it contacts any portion of enclosure 14 during the hitching procedure. Deflection of deflectable portion 116 causes a switch 118, housed in a non-deflectable portion 120 of the sensor, to close, thereby generating a warning signal. A light 122, also referred to herein as warning means, illuminates upon receipt of a warning signal from switch 118. Sensor 114 is mounted on brackets 124, 126 for shifting between its operating position, shown in FIG. 4, and its rest position, shown in FIG. 6. Bracket 126 has a notch 126a formed on an end thereof to coact with pin 112 for shifting sensor 114 between the operating position and the rest position.

A solenoid 128, having an arm 130, is connected to a traveling arm-down lock 132 for locking traveling arm 90 in a down position. Down lock 132 pivots about a down lock pin 134. Down lock 132 is operable on traveling arm bearing 88 to hold traveling arm 90 in a down position.

A traveling arm-down sensor switch 136 is operable with arm 90 in a down position to send an arm-down signal to a logic circuit, shown generally at 138. Switch 136 is activated when traveling arm bearing 88 makes contact with the plunger thereof.

A traveling arm-up sensor switch 140 is operable, when arm 90 is in the position depicted in FIG. 4, to transmit an arm-up signal to circuit 138.

A down lock position sensor 142 is operable to detect whether down lock 132 is in the locked or unlocked position and transmit a down lock position signal to circuit 138.

Trailer 80 includes an adjustable trailer jack, such as jack 144. Although a fifth wheel trailer generally has a pair of such jacks, the trailer of the preferred embodiment has a single jack mounted at the trailer centerline to simplify trailer leveling. Jack 144 includes a motorized jack screw assembly 146, a trailer jack housing 148 and an extensible leg 150. Leg 150 moves within housing 148 between a retracted position and an extended position. When in the extended position, the jack is operative to support the forward end of trailer 80.

A trailer jack position sensor 152 is operable to send a trailer jack retracted signal to circuit 138 when leg 150 is fully retracted and a rod 154, which is fixed to leg 150, contacts the plunger of the sensor. Rod 154 carries an adjustable slider 155 thereon which is shiftable to provide an indication of the position of leg 150 when trailer 80 is unhitched. The operation of this feature will be explained later herein.

Circuit 138 includes a control panel 166, which is mounted on trailer 80 (FIG. 4) and is protected by a locking cover 168.

Referring now to FIG. 6, the hitch of the invention is shown, in what is referred to herein as a hitched position. Traveling arm 90 and extensible portion 98 are in their extended positions. Down lock 132 has engaged traveling arm bearing 88 to prevent upward shifting of extensible portion 98 and obstacle sensor 114 has been raised to its rest position where it is maintained by over center spring 115. Socket 100 has engaged ball 38 and dog 102 has engaged the rear side of ball 38 to secure trailer 80 to vehicle 10. A hitch sensor pin 158 is mounted on a bracket 160 and is urged to a down position by a spring 162. As socket 100 fully receives ball 38, pin 158 is forced upwards compressing spring 162 and shifting the contacts on a switch 164, which is used to sense the position of pin 158.

Turning now to FIG. 7, circuit 138 is shown in its entirety. A leveling switch (curved mercury) 170 is mounted behind panel 166 and is operable to sense whether or not trailer 80 is level front-to-rear. A leveling circuit is activated by depressing a leveling switch 172.

Trailer jack 144 may be adjusted by means of a switch 174 (SPDTCO) which operates jack screw assemblies 146 to raise or lower the leg 150 of the trailer jack.

A function switch 176 (SPDTCO) is operable to extend or retract extensible portion 98 of hitch 82 and also to activate the peripheral devices which are required to hitch trailer 80 to vehicle 10.

An unhitch switch 178 is operable to activate hitch 82 to disconnect from vehicle 10.

System Operation

The positions of the contacts of the switches in FIG. 7 are set as they would appear with the trailer freestanding and hitch 82 in the position shown in FIG. 4.

The first step in connecting trailer 80 to vehicle 10 is to adjust the front end of trailer 80 to an appropriate height, thereby also adjusting the height of hitch 82. This is accomplished by adjusting trailer jack 144 to the appropriate height, such that slider 155 is aligned with the bottom of trailer jack housing 148. This is accomplished by retracting or extending leg 150 through activation of jack screw assembly 146 by switch 174.

Function selector switch 176 is placed in the load position which enables switch 118 to both illuminate light 122 and raise the front end of trailer 80, by lowering leg 150, should deflectable portion 116 come in contact with any portion of enclosure 14 as vehicle 10 is backed towards trailer 80.

The operator is able to back vehicle 10 directly under the forward portion of trailer 80 by referring to the position of the trailer and hitch 82 in the vehicle rearview mirror (which is located at the center line of vehicle 10). As vehicle 10 is placed in reverse, backup lights 50b, 52 and 54 are illuminated, providing additional lighting and assisting the operator in the hitching operation. Light 54, also referred to herein as towed vehicle alignment means, is positioned to provide a gun-sight type alignment indication with socket 100 when vehicle 10 and trailer 80 are properly aligned. Proper alignment may be made with reference to light 54 and socket 100 through the inside rear view mirror of vehicle 10, alleviating the need for the driver to contort as vehicle 10 is backed. As the inside rear view mirror is generally mounted on the vehicle centerline, more accurate backing is possible than if the driver twisted and attempted to directly, visually align socket 100 and ball 38.

If, during the course of backing the vehicle, light 122 is illuminated, the operator stops the vehicle until the light goes out. Illumination of light 122 is an indication that there is inadequate clearance between the base of socket 100 and the upper surface of enclosure 14. When circuit 138 is configured as thus far described, illumination of light 122 also results in operation of jack screw assembly 146 and the subsequent raising of the front end of trailer 80. The front end of the trailer will raise until deflectable portion 116 is no longer deflected and contact at switch 118 is broken. The warning signal generated by switch 118 will then cease, light 122 will go out and jack screw assembly 146 will stop.

The operator will then continue backing until light 122 is again illuminated and the cycle repeats. Enclosure 14 is configured such that rear portion 40 and the area of portion 34 aft of well 36 are lower than the level of portion 34 forward of well 36. Additionally, a rim 36a is provided as part of well 36 and is constructed to deflect portion 116 as socket 100 is directly positioned over ball 38.

Light 54 is provided to illuminate hitch 82 as the hitch is positioned over well 36 in order that the driver can see the position of the hitch relative to the well.

Once deflectable portion 116 has cleared the rear edge of well 36, the next object which it will contact is lip 36a, once again illuminating light 122 and advising the operator that hitch 82 is properly positioned over ball 38.

At this point, the operator changes switch 176 to the hitch position, which completes a circuit to hitch jack screw 96 through terminal switch 136A, thereby lowering extensible portion 98.

Hitch jack screw 96 will continue to operate until traveling arm 90 and extensible portion 98 reach their full down position, shifting switch 136 contacts to the B terminal, thereby energizing the B and E terminals of switch 142 and extending solenoid 128. The extension of solenoid 128 shifts the position of down lock 132 and also shifts, when down lock 132 is fully engaged, the contacts on switch 142 thereby energizing terminal 142F, terminal 152A and causing jack screw assembly 146 to raise leg 150. Leg 150 continues to raise until rod 154 contacts switch 152, shifting the contact to terminal 152B, stopping assembly 146 and energizing terminals 109B and 109F. Energizing terminal 109F causes solenoid 106 to shift dog 102 to a locked position, after which, switch 109 is thrown to make an A-C and B-E contact.

This completes the hitching sequence. The operator must then connect the safety chains and connect the trailer to the truck electrical supply in order to operate the lights and brakes on the trailer.

Once the vehicles have reached their destination, and the trailer has been properly positioned at its site, the vehicles may be unhitched. This procedure is initiated by depressing unhitch switch 178. This energizes switch 140 (normally closed) and terminals A-C of switch 109. Solenoid 106 is energized to shift, thereby unlocking dog 102 and shifting, upon full throw of arm 108, switch 109, energizing terminal 109D and, in turn, terminal 164A and jack screw assembly 146, thereby raising the front end of trailer 80, removing the weight of the trailer from ball 38.

When the front of the trailer is lifted slightly, hitch sensor pin 158 is urged to its down position, throwing switch 164 to terminal 164B, and energizing terminal 136B and terminal 142A-D. This causes arm 130 of solenoid 128 to retract, thereby shifting down lock 132 to its unlocked position, throwing switch 142, thereby energizing terminal 142C and hitch jack screw 96, causing extensible portion 98 to raise. As extensible portion 98 raises, sensor 114 is shifted to its operating position. Additionally, traveling arm 90 raises until it contacts sensor switch 140, opening the switch and breaking the circuit, and stopping jack screw 96.

At this point, the safety chains and electrical cord are disconnected between the trailer and the truck and the truck may be driven away free of the trailer. Slider 155 is positioned to indicate the level of leg 150 relative to housing 148. The trailer will be adjusted to this position prior to being rehitched to vehicle 10.

Front to back leveling of the trailer may be accomplished at this time. Switch 172 is depressed to energize mercury level switch 170. If contact is made at terminal 170A, it is an indication that the front of the trailer is too high, and jack screw 146 is energized to retract leg 150, thereby lowering the front end of the trailer.

Conversely, if contact is made at terminal 170B, it is an indication that the front of the trailer is too low and jack screw 146 is energized to raise the front of the trailer. Once the trailer is level, switch 170 breaks the circuit, ceasing operation of jack screw 146.

Thus a secured enclosure for a vehicle used to pull a fifth wheel trailer and a hitch for the trailer have been described. The invention provides additional watertight storage for objects which an RV user may wish to bring along, but does not otherwise have storage facilities for inside a trailer. The use of a hitch as described enables full utilization of the secured enclosure.

Although a preferred embodiment and a modification thereof have been disclosed, it should be appreciated that further modifications and variations may be made thereto without departing from the spirit of the invention.

It is claimed and desired to secure by Letters Patent:
1. A secured enclosure in combination with a pickup truck frame comprising:
   a multi-compartmental structure, each compartment therein having an opening and closure means associated therewith, said closure means having a watertight seal at its juncture with said compartment opening; and
   a hitch receiving watertight well formed in said structure extending between a top side thereof and a bottom side thereof for receiving a hitch for attaching a towed vehicle threto, said well having a substantially frusto-conical form.

2. The enclosure of claim 1 which further includes powered vent means to provide circulation of air through said structure to prevent condensation of moisture therein, said vent means including blowers mounted in said structures adjacent a front end thereof and louvered slots located in the rear end of said structure, for allowing air flow and preventing the introduction of water into the structure.

3. The enclosure of claim 1 which further includes a truncated V-shaped groove extending from a rear end of said enclosure to the rearward portion of said hitch receiving well.

4. The enclosure of claim 1 wherein said structure includes a pair of spaced apart side storage means each having plural watertight compartments therein, a bed carried on the truck frame extending in an integral, watertight sealed relationship between said side storage means, and bed covering means extending between the upper margins of said side storage means spaced above said bed, said covering means being removably secured in a watertight relationship to said side storage means, and, with said side storage means and said bed, defines a central watertight compartment.

5. The enclosure of claim 4 wherein said covering means includes a rear portion and a forward portion, said rear portion being openably and removably secured to said forward portion, and including a top cover section hinged to said forward portion, and a rear door section hinged to said top cover section, and which further includes a spring fastener which is operable to release and secure said top cover section when said rear door section is opened and closed, respectively.

6. The enclosure of claim 4 wherein said well extends between said covering means and said bed and which further includes towed vehicle alignment means mounted adjacent the rear portion of said well on said covering means.

7. The enclosure of claim 4 which includes covering means fasteners, said covering means having receptacles for said fasteners formed therein, said fasteners including cam means receivable in said receptacles for securing said covering means in a sealed relationship.

8. The enclosure of claim 1 which includes hinge means for swingably securing said closure means to said structure, said hinge means having a fixed segment attached to the structure and a swinging segment attached to said closure means, said first and second segments being rotatable about a hinge pin, said swinging segment having a first arcuate portion and a second arcuate portion constructed and arranged to allow the closure means to swing clear of the compartment opening when the closure means is in an open condition and to promote the forming of said watertight seal when the closure means is in a closed condition.

* * * * *